United States Patent
Hoke et al.

[11] 3,815,762
[45] June 11, 1974

[54] AUTOMATIC SHEET FEEDER

[75] Inventors: Kenneth E. Hoke; George R. Cunningham; Jerrold W. Greene, all of Marion, Ind.

[73] Assignee: Greene Line Manufacturing Corporation, Marion, Ind.

[22] Filed: Mar. 26, 1973

[21] Appl. No.: 344,900

[52] U.S. Cl. ........ 214/8.5 A, 214/8.5 F, 214/8.5 SS, 271/10, 271/128, 271/146, 271/164
[51] Int. Cl. ............................................ B65g 59/02
[58] Field of Search .......... 214/8.5 SS, 8.5 F, 8.5 A; 271/10.4, 128–130, 42, 35, DIG. 7, 12, 164, 147; 198/89

[56] References Cited
UNITED STATES PATENTS

| | | | |
|---|---|---|---|
| 1,948,001 | 2/1934 | Mensman et al. | 271/164 |
| 3,176,859 | 4/1965 | Prager | 214/8.5 SS |
| 3,195,740 | 7/1965 | Lange et al. | 271/42 X |
| 3,322,602 | 5/1967 | Schneider | 271/35 X |
| 3,434,584 | 3/1969 | Winkler | 198/89 |
| 3,664,522 | 5/1972 | Goto | 214/8.5 SS |
| 3,719,357 | 3/1973 | Shields | 271/12 |

Primary Examiner—Evon C. Blunk
Assistant Examiner—Bruce H. Stoner, Jr.
Attorney, Agent, or Firm—Woodard, Weikart, Emhardt & Naughton

[57] ABSTRACT

An apparatus for feeding sheets from a stack onto a conveyor. The stack is supported by a vertically movable platform which is positioned beneath horizontally movable pushing means. The means pushes sheets from atop the stack onto an adjacent conveyor which is telescopically constructed. The conveyor is pivotally mounted to allow positioning of the conveyor distal end allowing the conveyor to be swung upwardly during non-use. The means includes a pushing arm slidably mounted in the vertical direction which has a horizontal portion resting atop the stack and a vertical portion positioned adjacent the stack. An indicator signals the vertically movable platform when the top sheet on the stack is at a predetermined height.

9 Claims, 8 Drawing Figures

AUTOMATIC SHEET FEEDER

BACKGROUND OF THE INVENTION

1. Field of the Invention

This invention is in the field of feeders for stacks of sheets.

2. Description of the Prior Art

In the corrugated box industry, sheets of corrugated paperboard are fed into devices which in turn print information onto the sheets and fold and cut the sheets in order to produce the final product. Two devices for feeding the sheets from a stack are disclosed in the U.S. Pat. Nos. 2,988,236 issued to A. F. Shields and 3,174,633 issued to C. R. Stevens. An earlier device is disclosed in the U.S. Pat. No. 1,174,739 issued to S. M. Langston. The prior art feeding devices typically push sheets from atop the stack onto various types of conveyors. The pushing device is typically fixed in the vertical direction with the stacks being adjusted upwardly as sheets are removed therefrom. To ensure that the appropriate number of sheets are removed from the stack on each sweep of the pushing device, it is necessary that the upward movement of the stack be accurately controlled. Disclosed herein is a pushing device which floats in the vertical direction thereby minimizing the requirement for accurate control of vertical stack movement.

The sheets must be aligned as they are pushed from the stack and moved away from the stack by a conveyor. Disclosed in the U.S. Pat. No. 3,667,751 issued to P. Zernov et al., is a device for aligning rows of overlapping sheets. The aligning device disclosed in the Zernov patent includes walls which re fixed in a stationary position. When aligning relatively thick and heavy sheets, it is desirable to provide an aligning device which moves rapidly away from and then forward against the longitudinally extending edges of the row of sheets so as to align the sheets and to prevent jamming of the sheets within the aligning device. Disclosed herein is such an alignment mechanism.

The present apparatus combines means for pushing sheets from a stack onto conveying means with a platform supporting the stack providing for the automatic vertical movement of the stack. Other combinations are disclosed in the U.S. Pat. Nos. 2,665,633 issued to D. L. Schubert and 3,361,426 issued to F. F. Pawlikowski et al.

SUMMARY OF THE INVENTION

One embodiment of the present invention includes an apparatus for feeding sheets from a stack comprising supporting means for initially receiving and supporting the stack and being operable to move the stack upwardly as sheets are removed from atop the stack, conveying means mounted adjacent the supporting means and operable to receive and convey away sheets from atop the stack as the sheets are pushed from the stack to the conveying means, and pushing means mounted over the supporting means and having an outwardly extending portion and a downward extension connected together, the pushing means having the portion and extension slidably mounted thereto in an upward direction allowing the portion to rest atop the stack after the supporting means has moved the stack upwardly, the pushing means being operable to position the portion atop the stack and the extension vertically against the stack to push sheets therefrom to the conveying means, the extension extending a constant distance downward from the portion allowing the same number of sheets to be pushed off of the stack on each push.

It is an object of the present invention to provide a new and improved automatic sheet feeder.

A further object of the present invention is to provide means for repetitively removing sheets from atop a stack of sheets in a new and improved manner.

In addition, it is an object of the present invention to provide a new and improved device for aligning sheets in a row.

Related objects and advantages of the present invention will be apparent from the following description.

DESCRIPTION OF THE PREFERRED EMBODIMENT

Figure 1:
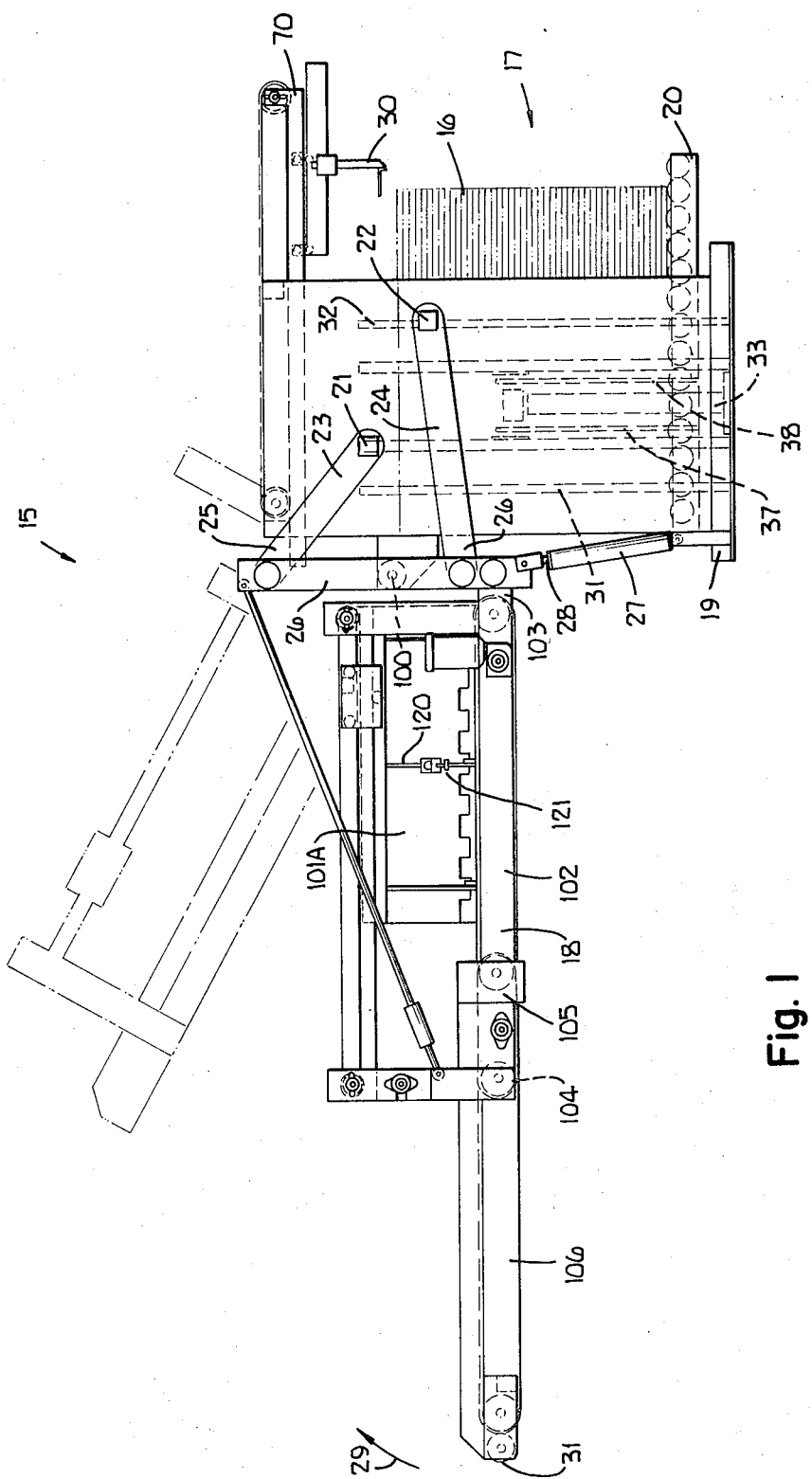
FIG. 1 is a side view of an apparatus incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an apparatus 15 for feeding sheets 16 from a stack 17. Stack 17 is received and supported by supporting means 20 which is operable to move the stack upwardly as the sheets are removed from atop the stack by pushing means 30. The sheets from atop the stack are pushed onto a conveying means 18 which is mounted adjacent to supporting means 20. Conveying means 18 is operable to receive and convey away sheets 16 from atop the stack as the sheets are pushed from the stack to the conveying means.

Apparatus 15 includes a frame 19 with a plurality of upstanding posts 21 and 22. A pair of links 23 and 24 have ends respectively pivotally mounted to posts 21 and 22. The opposite ends 25 and 26 of the links are pivotally mounted to vertical beam 26 upon which conveying means 18 is mounted. Cylinder motor 27 is pivotally mounted to frame 19 and has an extendable piston rod 28 pivotally connected to vertical beam 26. By extending piston rod 28, conveying means 18 is caused to pivot upwardly in the direction of arrow 29. Likewise, by retracting piston rod 28 the conveying means is pivoted downwardly. The end 31 of conveying means 18 may therefore be adjusted with respect to the floor. Likewise, the conveying means may be pivoted upward in order to allow access to the apparatus (not shown) which receives the sheets from end 31 of the conveying means.

Figure 5:
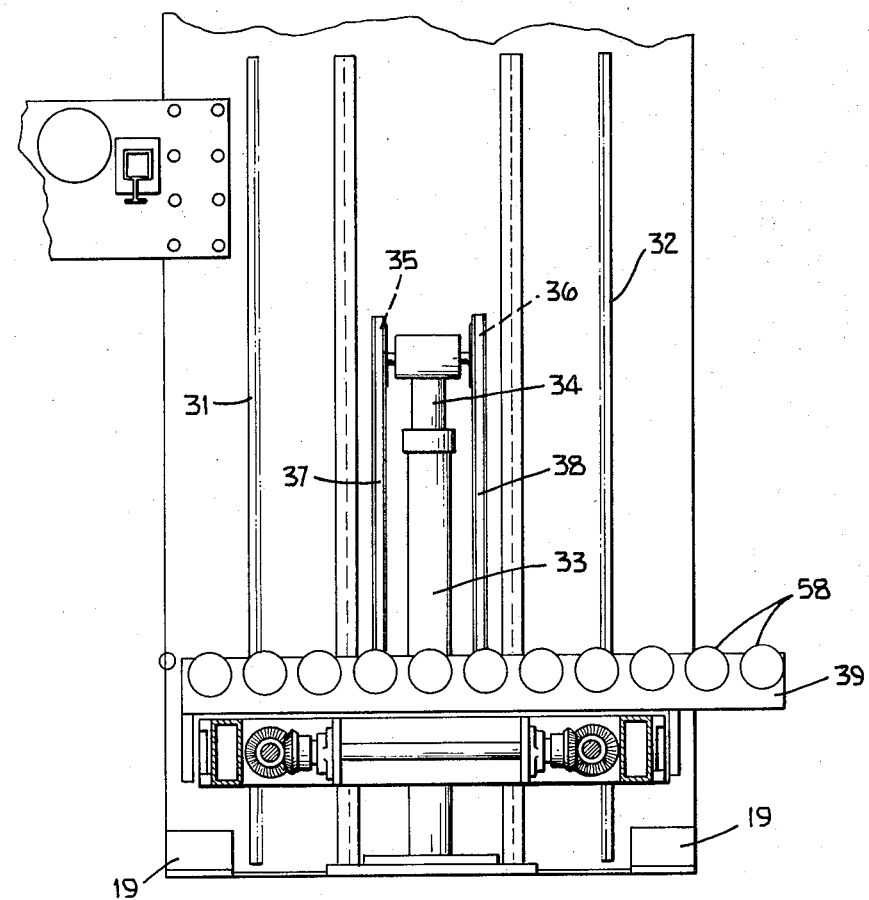
FIG. 5 is a fragmentary end view of supporting means 20.

A pair of racks 31 and 32 (FIG. 5) are fixedly mounted to frame 19 and have mutually facing teeth which are in meshing engagement with gears rotatably mounted to supporting means 20. The hydraulic cylinder 33 (FIG. 5) has an extendable piston rod 34 having a top end rotatably carrying a pair of sprockets 35 and 36. Sprockets 35 and 36 are in meshing engagement respectively with roller bearing chains 37 and 38. One end of each chain 37 and 38 is fixedly connected to frame 19 with the opposite end of each chain 37 and 38 fixedly connected to platform 39 of the supporting means. As a result, by extending and retarcting piston rod 34, platform 39 is caused respectively to move upwardly and downwardly.

Figure 3:
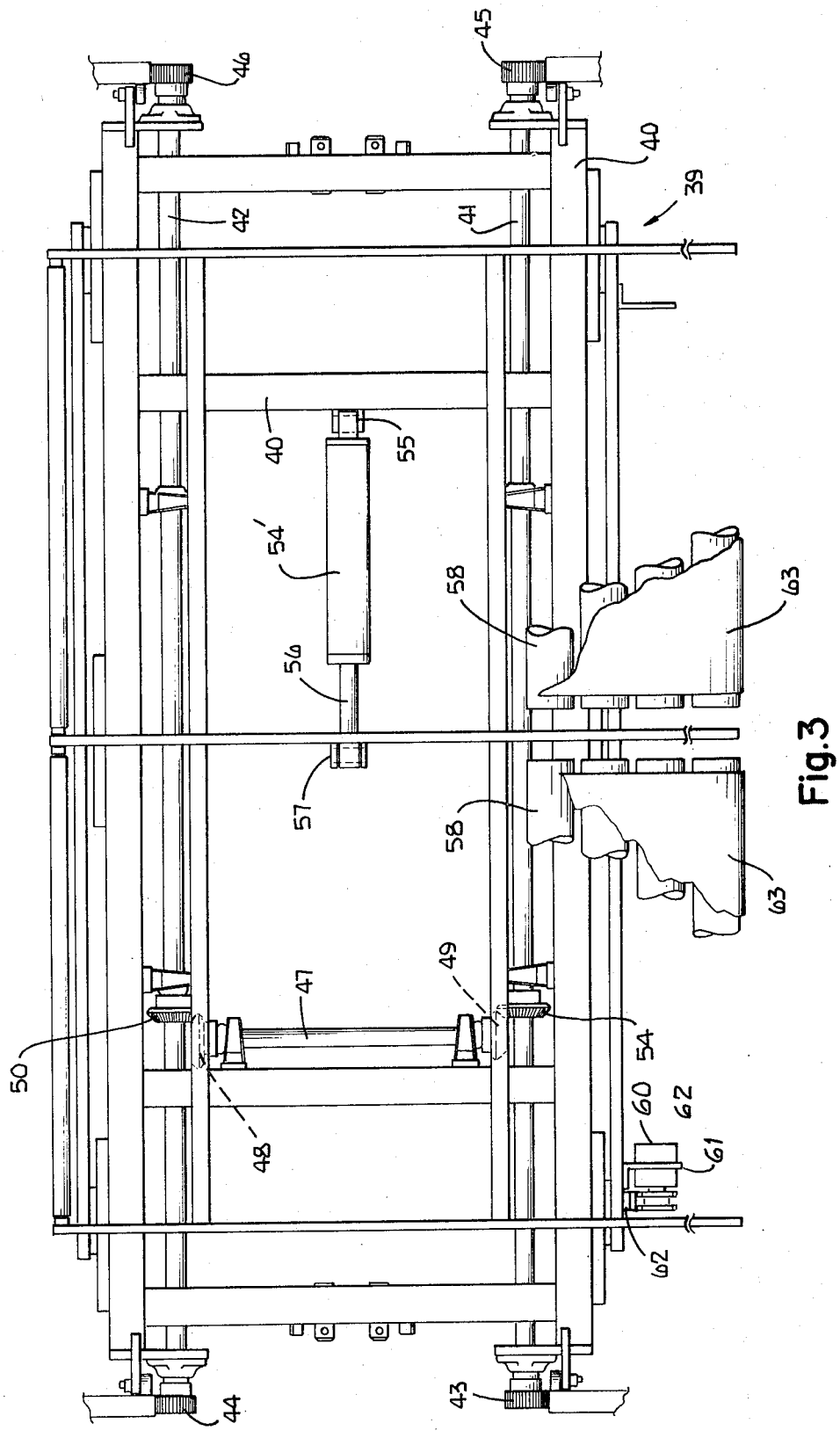
FIG. 3 is an enlarged fragmentary top view of supporting means 20 shown in FIG. 2.
Figure 4:
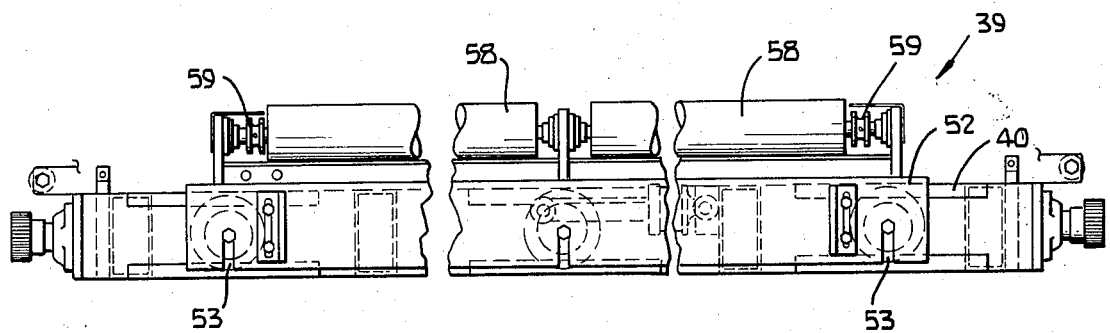
FIG. 4 is a fragmentary side view of the supporting means shown in FIG. 3.

Platform 39 (FIGS. 3 and 4) includes a rectangular bottom frame 40 having a pair of axles 41 and 42 rotatably mounted thereon. Axles 41 and 42 have a pair of gears 43 and 44 fixedly mounted thereto which engage a pair of vertical racks parallel to racks 31 and 32. In addition, a second pair of gears 45 and 46 are mounted to the opposite ends of axles 41 and 42 and are in meshing engagement with the second pair of racks 31 and 32 mounted to the opposite side of frame 19. A third axle 47 is rotatably mounted to the frame and extends perpendicular to axles 41 and 42. A pair of bevel gears 48 and 49 are mounted to the opposite ends of axle 47 and are in meshing engagement with bevel gears 50 and 54 fixedly secured to axles 42 and 41. Thus, gears 43 through 46 are sequenced together ensuring that platform 39 remains in a horizontal stable position.

Another rectangular frame 52 (FIG. 4) is movably mounted atop frame 40. Frame 52 has six supporting wheels 53 which are rotatably mounted thereto and which rest atop frame 40. Cylinder motor 54' (FIG. 3) is connected by bracket 55 to bottom frame 40. The extendable piston rod 56 is connected by bracket 57 to frame 52. As a result, relative horizontal motion transverse to the direction of movement of the sheets onto the conveyor may be controlled between the top and bottom frame. Frame 52 includes a plurality of rollers 58 which are rotatably mounted thereon and upon which the stack of sheets is supported. Rollers 58 are mounted to axles having double sprockets 59 mounted thereon. Sprockets 59 are in driving engagement with a hydraulic motor 60 mounted to bracket 61 secured to the platform. Chain 62 extends around the output sprocket of motor 60 and sprockets 59 connected to rollers 58. Thus, the rollers may be driven so as to position the stack of sheets the correct distance from the conveying means 18. A pair of continuous belts 63 extend around rollers 58 so as to slightly elevate the stack of sheets above the rollers thereby enabling the pushing means 30 (FIG. 1) to push the lowest sheet from the platform.

Figure 7:
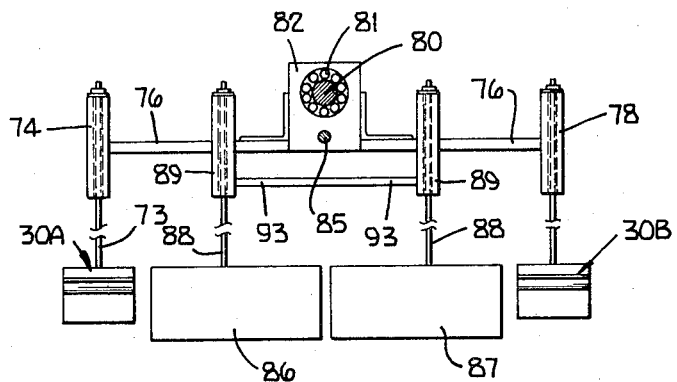
FIG. 7 is a fragmentary front view looking in the direction of arrows 7—7 of FIG. 6.

A horizontally extending beam 70 is mounted to frame 19 above supporting means 20. Pushing means 30 is slidably mounted to beam 70 to facilitate movement of the pushing means to and from the conveying means 18. Pushing means 30 includes a pair of pushers 30A and 30B (FIG. 7). Pusher 30A will now be described it being understood that a similar description applies to pusher 30B. Pusher 30A includes an upwardly extending wall 71 fixedly mounted to bar 73 and horizontal wall 72. The angle 75 between walls 71 and 72 is fixed. Bar 73 extends freely through block 74 fixedly mounted to elongated member 76. The top end of bar 73 is enlarged to limit the downward movement of bar 73 with respect to block 74. Free upward movement of bar 73 is allowed with respect to block 74 until the bottom edge of block 74 contacts wall 71. Block 78 of pusher 30B is also connected to elongated member 76 and has a bar which is similar to bar 73.

Figure 6:
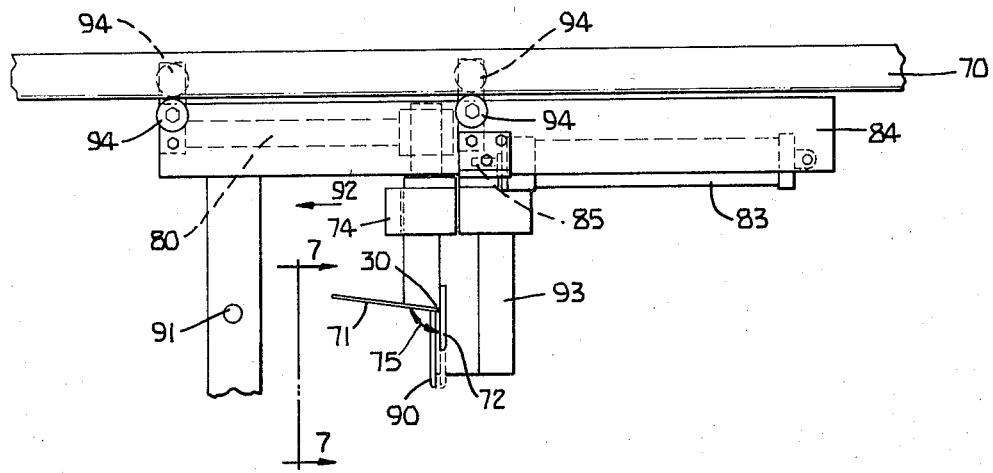
FIG. 6 is a fragmentary enlarged view of a pushing device 30 shown in FIG. 1.

Shaft 80 is horizontally suspended and mounted to beam 70 by bracket 84. Shaft 80 is received by bearings 81 mounted to bearing block 82 fixedly secured to elongated member 76. A pneumatic cylinder motor 83 is fixedly mounted to bracket 84 slidably secured to beam 70 and has an extendable piston rod 85 fixedly connected to bearing block 82. Thus, by extending rod 85, pushers 30A and 30B are caused to move toward the conveying means. A pair of backstops 86 and 87 are fixedly mounted to a pair of rods 88 which are slidably received in a pair of blocks 89 fixedly secured to elongated member 93 fixedly mounted to bracket 84. Rods 88 are freely slidable within blocks 89 and have enlarged top ends to limit downward movement of the backstops. As shown in FIG. 6, each backstop includes a horizontal wall 90.

The supporting means 20 is activated to force the stack of sheets upwardly until a photoelectric indicator 91 signals that the top sheet of the stack has passed through the photobeam of the indicator. Cylinder 83 is then activated to cause movement of pushers 30A and 30B in the direction of arrow 92 (FIG. 6) thereby causing wall 72 to contact the rear edge of the stack of sheets. The top wall 71 of each pusher contacts the top surface of the stack of sheets with rods 73 of each pusher moving upwardly so that each wall 71 will rest on the top edge of the stack thereby ensuring that walls 72 will extend downwardly from the top edge of the stack the same distance on each sweep of the pushers thereby ensuring that the same number of sheets are pushed from the stack on each cycle. Blocks 89 are fixedly mounted to bracket 93 which is secured in fixed relationship to beam 70. Thus, as pushers 30A and 30B move to and from the conveying means, backstops 86 and 87 will remain in a stationary position. As a result, when pushers 30A and 30B move in a direction opposite of arrow 92, wall 72 which will move backward against the top surface of the stack will not force any sheet of the stack in a direction opposite of arrow 92 since the stack will be held in place by backstops 86 and 87.

Bracket 84 is slidably mounted by rollers 94 to beam 70. Thus, the entire pushing means may be adjusted along beam 70 depending upon the width of the stack. A suitable sprocket and chain combination may be utilized to adjust bracket 84 with respect to beam 70.

Figure 2:
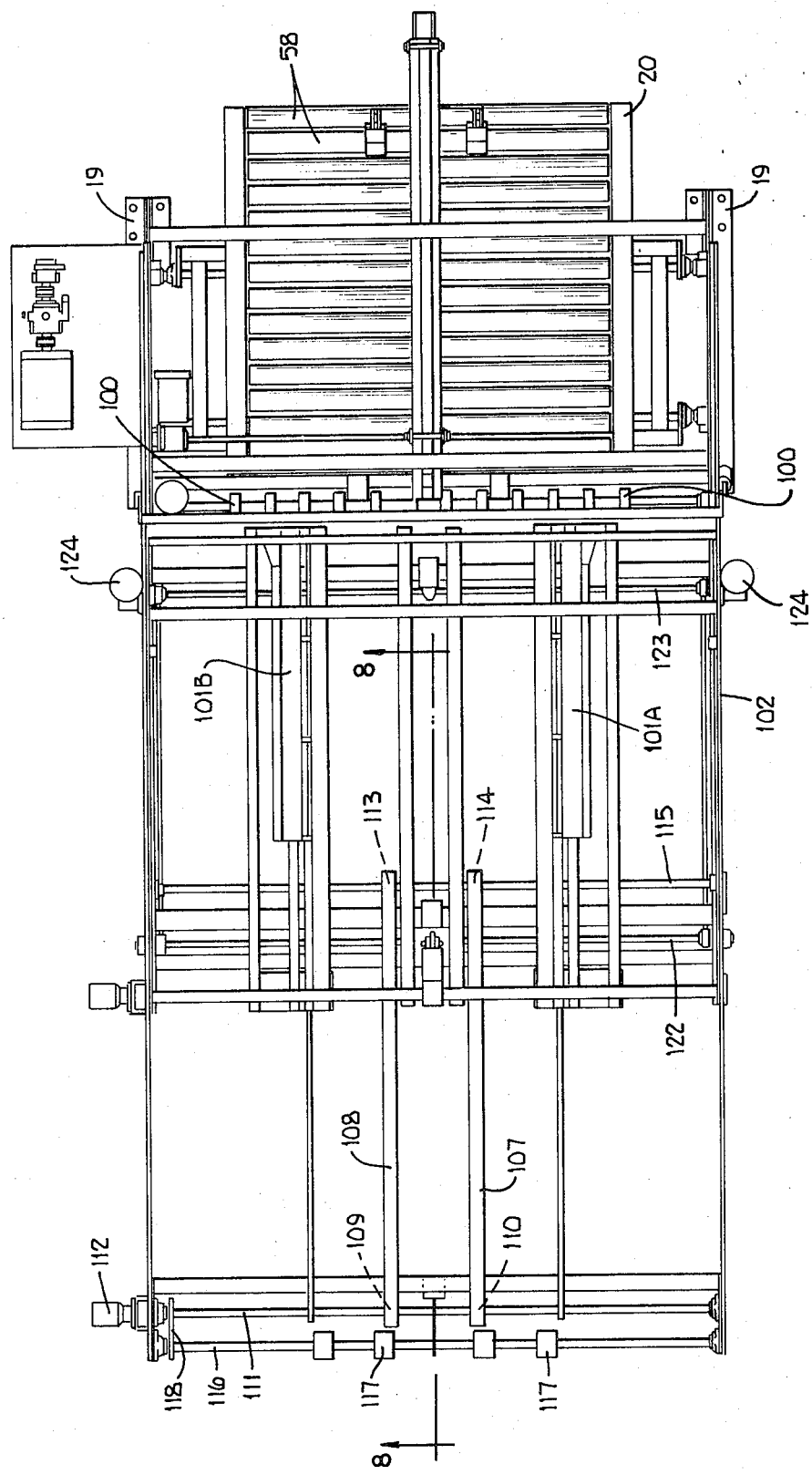
FIG. 2 is a top view looking at the apparatus shown in FIG. 1.

A plurality of rollers 100 (FIGS. 1 and 2) are rotatably mounted to frame 19 and are rotated by a suitable means such as a motor. Rollers 100 help push the sheets which are being pushed onto the conveying means 18 by the pushing means 30.

Conveying means 18 includes a first conveyor 102 with a proximal end 103 pivotally mounted to frame 19. The opposite distal end 104 of conveyor 102 slidably receives the proximal end 105 of a second conveyor 106. Conveyors 102 and 106 are each provided with positively driven continuous belts for conveying the sheets of material toward distal end 31. For example, conveyor 106 is provided with a pair of belts 107 and 108 (FIG. 2) which extend around pulley wheels 109 and 110 which are fixedly mounted to axle 111 rotatably mounted and driven by motor 112. Belts 107 and 108 also extend around and engage pulley wheels 113 and 114 which are fixedly mounted to axle 115. Axle 116 is rotatably mounted to conveyor 106 and carries end rollers 117 to assist the sheets off of the conveyor. Axle 116 is driven by chain 118 which in turn is driven by axle 111 and motor 112. Similar belts are provided on conveyor 102. Conveyors 102 and 106 are telescopically constructed so as to allow end 31 to be moved to and from the apparatus receiving the sheets from the conveying means. A suitable driving means (not shown) is provided such as a hydraulic cylinder to cause relative sliding motion between conveyors 102 and 106.

A pair of conveyor side guides 101A and 101B are mounted to conveyor 102 for aligning the sheets as they move through the conveying means. Guide 101A will now be described it being understood that a similar description applies to guide 101B. Guide 101A (FIG. 1) has a bottom end pivotally mounted to conveyor 102 and a top end connected to piston rod 120 of pneumatic cylinder 121 mounted to conveyor 102. By extending and retracting rod 120, guide 101A is caused to pivot towards and away from guide 101B. The bottom ends of the guides are spaced apart a distance equal to the width of the sheets. Thus, as the guides pivot inwardly the sheets are caused to become aligned. The bottom ends of guides 101A and 101B are threadedly mounted to a pair of rotatably mounted worm gears 122 and 123. Suitable motors 124 are mounted to the conveyor for rotating worm gears 122 and 123 thereby allowing for the adjustment of the spacing between guides 101A and 101B.

Figure 8:
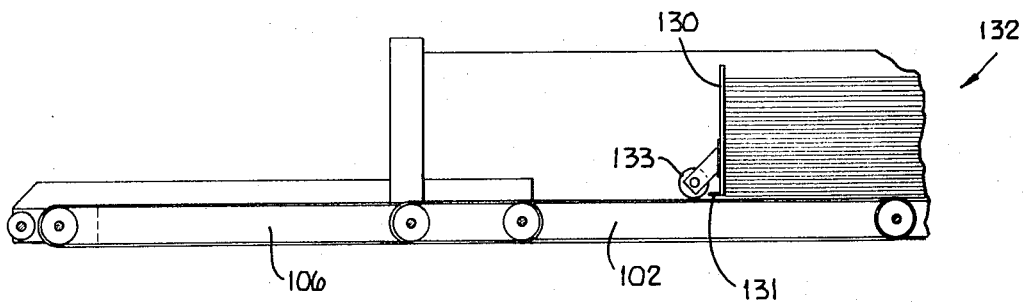
FIG. 8 is a fragmentary cross sectional view taken along the line 8—8 of FIG. 2 and viewed in the direction of the arrows.

A vertical stop wall 130 (FIG. 8) is mounted to the conveying means and has a bottom end 131 spaced upwardly from conveyor 102. Wall 130 allowed the sheets to accumulate on conveyor 102 since pushing means 30 feeds a larger quantity of sheets onto the conveyor than are allowed to pass beneath the bottom end 131 of the conveyor. As a result, sheets are continually fed off the end of distal end 31 of the conveying means even though all of the sheets in stack 17 have been pushed onto the conveying means. When stack 17 is depleted, a new supply of sheets may be supplied to form a new stack 17. During the replenishment of stack 17, sheets will continue to be fed off of end 31 as stack 132 decreases. A new stack 17 may be provided prior to the depletion of stack 132. A suitable roller 133 is rotatably mounted to wall 130 with the sheets from stack 132 passing beneath 133 and the conveyor belts on conveyor 102.

While the invention has been illustrated and described in detail in the drawings and foregoing description the same is to be considered as illustrative and not restrictive in character, it being understood that only the preferred embodiment has been shown and described and that all changes and modifications that come within the spirit of the invention are desired to be protected.

The invention claimed is:

1. An apparatus for feeding sheets from a stack comprising:
    supporting means for initially receiving and supporting said stack and being operable to move said stack upwardly as sheets are removed from atop said stack;
    conveying means mounted adjacent said supporting means and operable to receive and convey away sheets from atop said stack as said sheets are pushed from said stack to said conveying means; and,
    pushing means mounted over said supporting means and having an outwardly extending portion and a downward extension connected together, said pushing means having said portion and extension slidably mounted thereto in an upward direction with said portion normally located by gravity in a bottom position, said supporting means being operable to lift said stack upwardly against said outwardly extending portion lifting said portion above said bottom position and contacting said stack against said portion, said pushing means being operable to position said extension vertically against said stack to push sheets therefrom to said conveying means, said extension extending a constant distance downward from said portion allowing the same number of sheets to be pushed off of said stack on each push.

2. The apparatus of claim 1 wherein:
    said pushing means includes a frame extending toward said conveying means and a carrier slidably mounted on said frame, said pushing means includes a cylinder motor with an extendable and retractable piston rod connected to said carrier to move said carrier on said frame to and from said conveying means, said portion and said extension are slidably mounted vertically to said carrier.

3. The apparatus of claim 2 wherein:
    said pushing means includes a beam extending toward said conveying means with said frame slidably mounted on said beam.

4. The apparatus of claim 2 wherein:
    said outwardly extending portion is fixed with respect to said downward extension with said portion extending upwardly from horizontal.

5. The apparatus of claim 1 and further comprising:

said conveying means includes a conveyor frame and a first conveyor with a proximal end portion pivotally mounted to said conveyor frame and with an outer end, said conveying means further includes a second conveyor with an end mounted to said outer end, said conveying means includes a cylinder motor connected between said conveyor frame and said first conveyor to pivot said first conveyor and said second conveyor upwardly and downwardly;
    a vertical stop wall mounted across said first conveyor limiting movement of sheets on said conveying means received from said stack and providing an accumulation of sheets against said stop wall, said stop wall being spaced above said first conveyor a fixed distance allowing only a limited number of sheets from said accumulation to pass therebeneath at a time.

6. The apparatus of claim 1 wherein:

said supporting means includes a platform with a plurality of positively driven rollers rotatably mounted thereon to support said stack, said supporting means further includes a continuous belt extending around said rollers elevating said stack above said rollers and providing a gap therebetween.

7. The apparatus of claim 1 wherein:
said supporting means includes a supporting frame and a platform mounted thereon, said supporting means includes a first cylinder motor connected to said platform controlling vertical movement thereof and a second cylinder motor connected to said platform controlling horizontal movement thereof transverse to the direction of movement of said sheets passing from said supporting means to said conveying means, said platform includes a plurality of drivable rollers.

8. The apparatus of claim 1 and further comprising:

a pair of side guides pivotally mounted to said conveying means; and,
means mounted on said conveying means and connected to said guides being operable to pivot said guides into contact with said sheets on said conveying means to straighten said sheets.

9. An apparatus for feeding sheets from a stack comprising:
supporting means for initially receiving and supporting said stack and being operable to move said stack upwardly as sheets are removed from atop said stack;
conveying means mounted adjacent said supporting means and operable to receive and convey away sheets from atop said stack as said sheets are pushed from said stack to said conveying means; and, pushing means mounted over said supporting means and having an outwardly extending portion and a downward extension connected together, said pushing means having said portion and extension slidably mounted thereto in an upward direction with said portion normally located by gravity in a bottom position, said supporting means being operable to lift said stack upwardly against said outwardly extending portion lifting said portion above said bottom position and contacting said stack against said portion, said pushing means being operable to position said extension vertically against said stack to push sheets therefrom to said conveying means, said extension extending a constant distance downward from said portion allowing the same number of sheets to be pushed off of said stack on each push;
said conveying means includes a conveyor frame and a first conveyor with a proximal end portion pivotally mounted to said conveyor frame and with an outer end, said conveying means further includes a second conveyor with an end mounted to said outer end, said conveying means includes a cylinder motor connected between said conveyor frame and said first conveyor to pivot said first conveyor and said second conveyor upwardly and downwardly;
a plurality of feed rollers rotatably mounted to said first conveyor and positioned to force said sheet onto said first conveyor as said pushing means pushes said sheets off said stack;
said supporting means includes a supporting frame and a platform mounted thereon, said supporting means includes a first cylinder motor connected to said platform controlling vertical movement thereof and a second cylinder motor connected to said platform controlling horizontal movement thereof transverse to the direction of movement of said sheets passing from said supporting means to said conveying means, said platform includes a plurality of drivable rollers.

* * * * *